(12) United States Patent
Vlad

(10) Patent No.: US 6,902,756 B2
(45) Date of Patent: Jun. 7, 2005

(54) TRANSPARENT HIGH OIL LOADED MICROEMULSIONS

(75) Inventor: Florin Vlad, Annadale, NJ (US)

(73) Assignee: Firmenich SA, Geneva (CH)

( * ) Notice: Subject to any disclaimer, the term of this patent is extended or adjusted under 35 U.S.C. 154(b) by 365 days.

(21) Appl. No.: 09/825,526

(22) Filed: Apr. 2, 2001

(65) Prior Publication Data

US 2002/0187238 A1 Dec. 12, 2002

(51) Int. Cl.$^7$ .................................. A23L 2/00
(52) U.S. Cl. .................. 426/602; 426/599; 426/601
(58) Field of Search ................... 426/590, 602, 426/601

(56) References Cited

U.S. PATENT DOCUMENTS

| | | | |
|---|---|---|---|
| 3,704,137 A | | 11/1972 | Beck ............................ 99/140 |
| 4,146,499 A | | 3/1979 | Rosano ....................... 252/186 |
| 4,610,890 A | | 9/1986 | Miller et al. ................. 426/651 |
| 4,707,367 A | | 11/1987 | Miller et al. ................... 426/96 |
| 4,835,002 A | * | 5/1989 | Wolf et al. ................... 426/590 |
| 4,911,934 A | | 3/1990 | Yang et al. ...................... 426/5 |
| 5,045,337 A | * | 9/1991 | El-Nokaly et al. ........... 426/602 |
| 5,283,056 A | | 2/1994 | Chung et al. .................. 424/49 |
| 5,374,614 A | * | 12/1994 | Behan et al. ................... 512/3 |
| 5,376,397 A | | 12/1994 | Gaonkar ...................... 426/602 |
| 5,607,707 A | * | 3/1997 | Ford et al. ....................... 426/2 |
| 5,674,549 A | | 10/1997 | Chmiel et al. ............... 426/602 |
| 5,885,629 A | * | 3/1999 | Ford ............................... 426/2 |
| 6,077,559 A | * | 6/2000 | Logan et al. ................ 426/650 |
| 6,251,441 B1 | * | 6/2001 | Van Den Braak et al. ...... 426/2 |
| 6,426,078 B1 | | 7/2002 | Bauer et al. ................. 424/401 |
| 6,444,253 B1 | * | 9/2002 | Conklin et al. ............. 426/651 |

FOREIGN PATENT DOCUMENTS

| | | |
|---|---|---|
| EP | 0 202 409 A2 | 11/1986 |
| GB | 0572080 | * 1/1993 |
| WO | WO 99/27798 | 3/1997 |

OTHER PUBLICATIONS

Griffin, XP-002148649, "Kirk-Othmer Encyclopedia of Chemical Technology: Emulsions" Kirkothmer Encyclopedia of Chemical Technology, Diuretics to Emulsion, New York, Wiley & Sons, vol. 8, pp 900-930 (1979).

Kanebo, XP020516,Microemulsion of high stability, useful for cosmetics and medicine– contg. liq. oily substances, surfactants vitamin–E and water, mixed at high pressure to form emulsion of specific mean dis WPI World Patent Information Derwent, vol. 37, NR 91 (1991).

Kaur et al., Antioxidants in fruits and vegetable—millennium health, International Journal of Food Science and Technology, Blackwell Scientific Publications, Oxford, vol. 36, pp. 703–725 (2001).

S. Tenjarla, XP009004484,Microemulsion: An Overview and Pharmaceutical Applications. Critical Reviews in Therapeutic Drug Carrier Systems; vol. 16, No. 5, pp. 461–521 (1999).

* cited by examiner

*Primary Examiner*—Carolyn Paden
(74) *Attorney, Agent, or Firm*—Winston & Strawn LLP

(57) ABSTRACT

Formulations of clear, thermodynamically stable and concentrated oil-in-water microemulsions are disclosed, as well as their use for the flavoring of clear beverages.

14 Claims, No Drawings

TRANSPARENT HIGH OIL LOADED MICROEMULSIONS

TECHNICAL FIELD

The present invention relates to the flavor industry. It concerns more particularly a clear, thermodynamically stable and concentrated oil-in-water microemulsion comprising at least 30% by weight of flavor oil, at least two nonionic food grade surfactants forming a "surfactant system" with a defined hydrophilic lipophilic balance, and having an optimized ratio of surfactant versus a co-solvent. The invention also relates to the use of said microemulsion in the formulation of clear beverages.

BACKGROUND OF THE INVENTION

Emulsions have been widely used in beverage technology, cosmetics, or pharmaceutical formulations for many years. Nevertheless, their limited thermodynamic stability, which means that they separate into their two original liquid phases on standing, represents the biggest drawback in application. Due to their time limited thermodynamic stability, all the emulsion based products will undergo oil-ringing formation, and finally phase separation.

Unlike emulsions, the microemulsions, including the micellar solutions, are usually transparent dispersions that form spontaneously without the need of energy input, when the compounds thereof are properly mixed with each other. Due to the very small size of dispersed oil-droplets, in fact in most cases the dispersed oil-droplets are less than 140 nm in diameter, the visible light cannot be scattered and therefore microemulsions appear as clear or translucent isopropic solutions. A classical oil-in-water microemulsion consists of water, a co-solvent such as alcohol, oil and one or more surfactants and co-surfactants. Although microemulsions form spontaneously, when they form, the selection of the components thereof and their relative amounts are very critical for their formation, their final characteristics such as optical appearance, and their organoleptic and thermodynamic time-stability. In addition, when such microemulsions are used as flavor delivery systems in food products, for example in beverages, they must fulfill all the requirements of these products, namely an excellent shelf-life stability over a large temperature range, at least a few months, and no formation of off-notes.

In the field of beverage flavoring, the use of microemulsions has been described in particular by Wolf et al. in U.S. Pat. No. 4,835,002. The latter document discloses microemulsions of edible oils in a matrix of water and certain alcohols, together with food-grade surfactants. More particularly, this document describes compositions comprising from 0.01 to 45% by weight, and preferably from 1 to 25% by weight, of oil, from about 0.1 to 60%, and preferably from 1 to 30% by weight, of surfactant and from 20 to 95%, and preferably 25 to 80% by weight, of a polyol including ethanol, propylene glycol, sugars such as dextrose, sucrose, fructose and other. The proportion of alcohol needed in said microemulsion compositions is of at least 20% by weight in order to obtain a clear system. Propylene glycol is selected as preferred alcohol.

Now, one objective of the present invention is to prepare a high oil loading, transparent, microemulsion with an optimized ratio between the surfactant system and the alcohol.

U.S. Pat. No. 5,283,056 describes compositions of transparent oil-in-water microemulsion concentrates, consisting essentially of water, one or more hydrophobic flavor or fragrance oils and one or more surfactants. Said microemulsions are especially intended for the preparation of mouthwash solutions and are essentially free of lower alkanols. Nevertheless, these compositions comprise large amounts of surfactant, particularly when high oil content is required. Moreover, the claimed microemulsions show poor shelf-life stability even at room temperature, that would not be convenient for beverage applications.

We have now been able to establish a novel and advantageous formulation of edible, perfectly clear, high oil loaded microemulsions that are entirely composed of food grade quality components, which comprise a very low level of surfactant/co-surfactant, and which prove excellent organoleptically and from the point of view of the thermodynamic stability, both as emulsions end and in end-products where they may be employed as flavor carriers.

BRIEF SUMMARY OF THE INVENTION

The present invention thus relates to a clear, high oil loaded, thermodynamically stable, oil-in-water microemulsion comprising at least 30% by weight of oil, from 1 to 30% by weight of a surfactant system with a hydrophilic lipophilic balance (HLB) between 9 and 18; less than 20% by weight of co-solvent; and at least 30% by weight of water. The proportions are given relative to the total microemulsion composition, whereas what is meant by "surfactant system" is a group of at least two surfactants forming a system characterized by an average HLB value as defined above, and the co-solvent may be any alcohol such as ethanol, propylene glycol, sugars or a mixture thereof.

The optimized here-described formulation has many advantages. In particular, said microemulsions comprise a very small amount of surfactant and alcohol, the latter acting both as co-solvent and co-surfactant, while both the thermodynamic and organoleptic stability of said microemulsion are excellent over large temperature ranges.

Since the microemulsions of the invention are particularly stable, high loaded in oil and clear, they can be very advantageously used as flavor carriers, in particular for clear beverages. On the other hand, because of their particular stability, they may also constitute a good starting product to be extruded for the preparation of encapsulated flavors.

More objects, aspects and advantages of the invention will become apparent from the detailed description hereafter.

DETAILED DESCRIPTION OF THE INVENTION

It has thus been unexpectedly discovered that even with a low ratio of co-solvent relative to surfactant in its composition, a microemulsion may comprise a high amount of oil and also be particularly stable, notably at high temperatures.

As previously cited, one object of the present invention is to provide a clear, high oil loaded, thermodynamically stable oil-in-water microemulsion comprising:
a) at least 30% of oil;
b) from 1 to 30% of a surfactant system with a hydrophilic lipophilic balance HLB comprised between 9 and 18;
c) less than 20% of co-solvent; and
d) at least 30% of water.

In a preferred embodiment, the ratio between the co-solvent and the surfactant system is of 1 to 1. By comparison with the prior art, for instance U.S. Pat. No. 4,835,002, the amount of surfactant required in the present invention is much lower. As it is well known in the art, a large amount of surfactant in a system such as that of a microemulsion may be responsible for many drawbacks such as off-notes, foaming and also high viscosity. Therefore the possibility of using a low amount of surfactant, while keeping a high amount of oil, is very advantageous for the microemulsion applications such as the flavoring of clear beverages and is a totally surprising result.

All the microemulsions of the invention may be advantageously used as flavor carriers in beverages where they provide clear, foam-free beverages, without oil ring formation or soapy off-notes.

Fundamentally, the microemulsions according to the present invention consist of dispersed edible oils in a matrix of water and certain alcohols by using surfactants of the food grade type.

The edible oils dispersed in said matrix of water and alcohol may be one or a mixture of oils soluble in one another. They may also be mixed with a fragrance oil, provided that the flavor or fragrance oil is water immiscible. The oils constitute the oil phase of the microemulsion, whereas the alcohol-water medium constitutes the continuous phase. Specific examples of oils which may be used alone or in admixture in the microemulsions of the present invention include natural extracts such as lemon, berry, lime, orange, grapefruit, tangerine, mandarin, kumquat, bergamot oil or any mixture thereof.

The oil represents at least 30% by weight of the microemulsion, relative to the total weight of the latter and is preferably present in amounts above 45% by weight.

In a particular embodiment, the oil phase further comprises an oil-soluble antioxidant such as for instance tocopherol, which provides a better stability of the microemulsion.

The microemulsion further comprises from 1 to 30% by weight of a surfactant system. Said system comprises at least two surfactants and is characterized by its HLB (hydrophilic lipophilic balance) which, as is known in the art, is calculated for a system, similarly as for individual compounds and which, according to the invention, is comprised between 9 and 18, and more preferably between 12 and 15. Surfactants useful for the purpose of the present invention are approved for use in food type products and include notably Tween® 20 (polyoxyethylene (20) sorbitan monolaurate; origin: ICI, Great Britain); Tweeno® 40 (polyoxyethylene (20) sorbitan monopalmitate; origin: ICI; Great Britain); Tween® 60 (polyoxyethylene (20) sorbitan monostearate; origin: ICI, Great Britain); Tween® 80 (polyoxyethylene (20) sorbitan monooleate; origin: ICI, Great Britain); Glycosperse® L-20 (polyethylene glycol sorbitan laurate; origin: Lonza, Switzerland); Glycosperse® O-20 (hexaethylene glycol sorbitan monooleate; origin: Lonza, Switzerland); Glycosperse® S-20 (polyoxyethylene sorbitan stearate; origin: Lonza, Switzerland); Polyaldo® 10-1-O K (decaglyceryl monooleate—kosher food grade; origin: Lonza, Switzerland); Polyaldo® 10-2-O K (decaglyceryl dioleate—kosher food grade; origin: Lonza, Switzerland); Glycosperse® TS-20 (polyoxyethylene sorbitan tristearate; origin: Lonza, Switzerland); Lonzest® SMO-20 (monodehydrosorbitol monooleate; origin: Lonza, Switzerland); Span® 20 (sorbitan monolaurate; origin: ICI, Great Britain); Span® 40 (sorbitan monopalmitate; origin: ICI, Great Britain).

According to a specific embodiment of the invention, the weight ratio between 25 surfactant and so-solvent is of 1 to 1. This embodiment is particularly advantageous since it outlines the possibility of having high oil content product, which stays very stable as shown in the example below, while reducing the proportion of surfactant to a minimum.

The co-solvent present in the microemulsion of the invention is present in an amount of less than 20% by weight, relative to the total weight of the microemulsion. It can be typically an alcohol selected from the group consisting of propylene glycol, ethanol, mono- and di-saccharide sugars and sugar alcohols such as sorbitol, xylitol and mannitol. Preferably, there will be used propylene glycol.

Finally, a minimum of 30% water will be used, to complete the continuous phase of the microemulsion.

A microemulsion according to the invention is prepared by adding to the prior made continuous phase (mixture of water and alcohol), a primary surfactant, which provides a clear surfactant/water-phase dispersion. Over this surfactant dispersion is added the oil-phase and a lactescent or milky dispersion forms under gentle agitation. In the final step, a co-surfactant, which generally has a lower HLB than the primary surfactant, is added to the lactescent dispersion to convert it into a clear microemulsion.

Following the above method of preparation, stable, transparent clear microemulsions with a high oil content have been prepared by employing a minimum amount of surfactant and an optimized amount of alcohol.

Due to an excellent thermodynamic stability, clarity and no oil-ring formation in the formulated products, the microemulsions are advantageous flavor sources for the beverage market, in particular for clear beverage formulations. One further object of the invention is therefore the use of a microemulsion as described above as carrier of flavor oils for beverage formulations, and further clear beverages formulated on the base of such microemulsions.

In such beverages, carbonated or not, the emulsion of the invention will be typically present in proportions comprised between 0.05 and 0.2% of the total weight of the composition or product to be flavored. Clear beverages formulated with the help of a microemulsion of the invention present no off-notes and the stability of the final formulation is excellent.

Clear beverages flavored with a microemulsion according to the invention may advantageously comprise antioxidant ingredients.

The invention therefore also relates to a method to impart, improve, enhance or modify the flavoring properties of a flavoring composition or a flavored product which comprises adding to said composition or product a microemulsion as defined above.

Finally, it has been unexpectedly established that the microemulsions of the invention can be advantageously used as feed-in sources of flavor oil in extrusion technologies. By extrusion technologies it is meant here methods which typically rely on the use of carbohydrate matrix materials which are heated to a molten state and combined with an active ingredient, before extruding and quenching the extruded mass to form a glass which protects said ingredient. A great deal of prior art describes extrusion techniques. Typical citations include in particular U.S. Pat. No. 3,704,137, U.S. Pat. No. 4,707,367, U.S. Pat. No. 4,610,890, WO 99/27798, U.S. Pat. No. 4,977,934, EP 202409 which are all hereby included by reference, and a more detailed description of such extrusion methods is not warranted here.

The invention will now be illustrated by way of the following examples but is not limited to these examples. Temperatures are given in degrees centigrade and the abbreviations have the meaning common in the art.

EMBODIMENTS OF THE INVENTION

Example 1

Preparation of Microemulsions According to the Invention

An initial water-phase was prepared based on the following formula:

242.5 g of water phase, consisting of water and propylene glycol, having the following composition:

| | |
|---|---|
| Water | 62.9% w/w |
| Propylene glycol | 37.1% w/w |

To the above 242.5 g water phase, was added the surfactant system consisting of:

| | |
|---|---|
| Polyaldo ® 10-1-K[1] | 32.25 g |
| Glycosperse ® S-20 K[2] | 35.45 g |
| Glycosperse ® TS-20 K[3] | 7.55 g |

1) decaglycerol monooleate with HLB=13 ; origin: Lonza, Switzerland

2) POE (20) sorbitan monostearate with HLB=15 ; origin: Lonza, Switzerland

3) POE (20) sorbitan tristearate with HLB=11; origin: Lonza, Switzerland

By mixing the surfactant system with the water phase, a pre-microemulsion cocktail was obtained with the following composition:

| | |
|---|---|
| Water phase | 75.6% w/w |
| Surfactant system | 24.4% w/w |

Four different samples were then prepared with 64.15 g of this cocktail added to respectively 28.00 g of different kinds of citrus oil, namely lemon *, lime *, orange * and grapefruit *. After mixing together, stable clear microemulsions were formed.

origin: Firmenich Citrus Center, Florida, USA, with 0.01% w/w tocopherol versus oil phase In all cases the composition of the resulted microemulsion was:

| | |
|---|---|
| Water phase | 52.6% w/w |
| Surfactant system | 17.0% w/w |
| Oil phase | 30.4% w/w |

Example 2

Preparation of Microemulsions According to the Invention

Microemulsions were prepared as described in Example 1, from the following formulations:

| (i) | Ingredients | Parts by weight |
|---|---|---|
| | Water | 32.3 |
| | Propylene glycol | 19.1 |
| | Polyaldo ® 10-1-O K[1] | 7.5 |
| | Glycosperse ® S-20 K[2] | 7.6 |
| | Tween ® 81[3] | 1.7 |
| | Lemon oil[4] | 31.8 |
| | Total | 100.0 |

1) see Example 1
2) see Example 1
3) POE (20) sorbitan monooleate; origin: ICI, Great Britain
4) origin: Firmenich Citrus Center, Florida, USA

| (ii) | Ingredients | Parts by weight |
|---|---|---|
| | Water | 36.4 |
| | Propylene glycol | 12.1 |
| | Polyaldo ® 10-1-O K[1] | 8.3 |
| | Glycosperse ® S 20 K[2] | 6.8 |
| | Glycosperse ® O-20 K[3] | 0.3 |
| | Lemon oil[4] | 31.5 |
| | Total | 100.0 |

1) 2) 3) see Example 1
4) origin: Firmenich SA, Geneva, Switzerland

Example 3

Non Carbonated Clear Beverages

The 4 samples prepared according to Example 1 were used to formulate non-carbonated clear berverages, which were tested over a 4 week period in an accelerated stability test program, at the following temperatures: 4.4°, 21.1° and 32.2°.

The stability test results of these beverages have been compared with the stability test results of the beverages prepared by using current washed-oils instead of microemulsions.

After 4 weeks of tests, the results showed no significant difference, at 95% confidential level, between the two sets of beverages, microemulsion-base-beverages and washed-oil-base-beverages.

All finished beverages were made using the liquid microemulsion in a solution containing high fructose corn syrup, 0.05% ascorbic acid (as a water soluble antioxidant), 0.15% citric acid and water. The beverages were hot packed at 88°–90° for 2 minutes prior to storage.

What I claim is:

1. An edible, clear, high oil loaded, thermodynamically stable oil-in-water microemulsion comprising:
   (a) at least 30% of oil;
   (b) from 1 to 30% of non-ionic surfactant system having a hydrophilic lipophilic balance, HLB, comprised between 9 and 18;
   (c) less than 20% of co-solvent; and
   (d) at least 30% of water;
wherein the weight ratio between the surfactant system and the co-solvent is of 1 to 1.

2. A microemulsion according to claim 1, wherein the oil phase comprises an oil-soluble antioxidant.

3. A microemulsion according to claim 2, wherein the oil-soluble antioxidant is tocopherol.

4. A microemulsion according to claim 1, wherein the oil is selected from the group consisting of lemon, berry, lime, orange, grapefruit, tangerine, mandarin, kumquat and bergamot oil, and any mixture thereof.

5. A microemulsion according to claim 1, wherein the surfactant system comprises at least one surfactant selected from the group consisting of polyoxyethylene (20) sorbitan monolaurate, polyoxyethylene (20) sorbitan monopalmitate, polyoxyethylene (20) sorbitan monostearate, polyoxyethylene (20) sorbitan monooleate, polyethylene glycol sorbitan laurate, hexaethylene glycol sorbitan monooleate, polyoxyethylene sorbitan stearate, decaglyceryl monooleate, decaglyceryl dioleate, polyoxyethylene sorbitan tristearate, monodehydrosorbitol monooleate, sorbitan monolaurate and sorbitan monopalmitate.

6. A microemulsion according to claim 1, wherein the co-solvent is an alcohol selected from the group consisting of propylene glycol, ethanol, mono- and di-saccharide sugars and sugar alcohols.

7. A microemulsion according to claim 6, wherein the sugar alcohol is selected from the group consisting of sorbitol, xylitol and mannitol.

8. A microemulsion according to claim 6, wherein the alcohol is propylene glycol.

9. A microemulsion according to claim 1, wherein the surfactant system has a lipophilic hydrophilic balance comprised between 12 and 15.

10. A clear beverage comprising a microemulsion according to claim 1.

11. A clear beverage according to claim 10, comprising an antioxidant.

12. A method for imparting, improving, enhancing or modifying the organoleptic properties of a flavoring composition or a flavored product, wherein a microemulsion according to claim 1 is added to said composition or product as a flavor carrier.

13. A method according to claim 12, wherein the flavored product is a clear beverage.

14. A process for the preparation of a microemulsion comprising at least 30% of oil; from 1 to 30% of a non-ionic surfactant system having a hydrophilic lipophilic balance, HLB, comprised between 9 and 18; less than 20% of co-solvent; and at least 30% of water, comprising the steps of:

(a) preparing a continuous phase consisting of water and co-solvent;

(b) adding a primary surfactant to get a clear surfactant/water phase dispersion;

(c) adding an oil phase, to form a milky dispersion;

(d) titrating said dispersion with a co-surfactant to convert it into a clear microemulsion.

* * * * *